United States Patent [19]
Srinivasan

[11] Patent Number: 5,784,623
[45] Date of Patent: Jul. 21, 1998

[54] USING A PARENT LATCH THAT COVERS A PLURALITY OF CHILD LATCHES TO TRACK THE PROGRESS OF A PROCESS ATTEMPTING TO ACQUIRE RESOURCES

[75] Inventor: Kesavan P. Srinivasan, Sagamore Hills, Ohio

[73] Assignee: Oracle Corporation, Redwood Shores, Calif.

[21] Appl. No.: 654,552

[22] Filed: May 29, 1996

[51] Int. Cl.⁶ .................................................. G06F 13/14
[52] U.S. Cl. .................................... 395/726; 395/474
[58] Field of Search .................................. 395/726, 650, 395/674, 474, 475, 481

[56] References Cited

U.S. PATENT DOCUMENTS

| | | |
|---|---|---|
| 5,317,737 | 5/1994 | Barton . |
| 5,317,749 | 5/1994 | Dahlen . |
| 5,502,840 | 3/1996 | Barton . |
| 5,623,670 | 4/1997 | Bohannon et al. . |

OTHER PUBLICATIONS

"Operating Systems Design and Implementation," Andrew S. Tanenbaum, 1987, pp. 129–130.
"Operating Systems Concepts, Policies, and Mechanisms," James R. Pinkert, Larry L. Wear, 1988, pp. 156–157.
"Adaptive Locking Strategies in a Multi–Node Data Sharing Environment," Ashok M. Joshi, Digital Equipment Corporation, believed to be published before Feb. 27, 1996.
"Lock Management," Digital Equipment Corporation, believed to published before Feb. 27, 1996.

Primary Examiner—Jack B. Harvey
Assistant Examiner—Rupal D. Dharia
Attorney, Agent, or Firm—Lowe, Price, LeBlanc & Becker

[57] ABSTRACT

A method and apparatus for managing latches that protect resources is provided. A group of resources is divided into a plurality of subgroups of resources. Each subgroup of resources is provided its own latch. The latches for the subgroups of resources are ordered. When a process requires access to more than one subgroup of resources, the process acquires the latches for the subgroups in an order that is based on the order of the latches. By using these access techniques, processes may simultaneously access different subgroups of the group of resources without the possibility of deadlock. A process that requires all subgroups within a group of resources acquires a parent latch associated with the group of resources. The process then acquires the latches for each subgroup in a sequence that is based upon the order of the latches. As the process acquires each new latch, the process updates a current position value in the parent latch to indicate the most-recently-acquired latch. The current position value may be used by a cleanup entity in case the process dies prematurely. After acquiring all of the latches, the process releases the latches in reverse order, and updates the current position value as each latch is released. Thus, the current position value may be used for cleanup whether the process dies while attempting to acquire all latches or while releasing all latches.

18 Claims, 3 Drawing Sheets

USING A PARENT LATCH THAT COVERS A PLURALITY OF CHILD LATCHES TO TRACK THE PROGRESS OF A PROCESS ATTEMPTING TO ACQUIRE RESOURCES

FIELD OF THE INVENTION

The present invention relates to techniques for sharing resources within a computer system, and more specifically, to techniques for avoiding deadlock when sharing resources among many processes.

BACKGROUND OF THE INVENTION

Within computer systems, certain resources can be shared by processes but can only be used by one process at any given time. Locks are a mechanism used to prevent more than one process from simultaneously accessing such resources. Before a process accesses a resource, the process must acquire ownership of a lock that corresponds to the resource. If another process owns the lock, the process must wait for the other process to release the lock. While a process owns the lock, the process may use the resource, and other processes that desire to use the resource must wait for the process to release the lock. Various types of locks and lock management mechanisms have been developed.

Latches, also called spin-locks, are locks that can assume two states: FREE and BUSY. Typically, latches are used as low-level in-memory locks that protect data structures in shared memory. In a multi-process environment, latches are used to ensure that only one process at a time gets exclusive access to the shared resource that corresponds to the latches. A process can only acquire a FREE latch. A process acquires a latch by setting a FREE latch to BUSY. This is typically performed by an atomic test-and-set operation. Once a process acquires a latch, the process can safely access the data stored in the block of shared memory that corresponds to the latch knowing that no other process will be accessing the same block of shared memory while the process owns the latch. Even when multiple processes are simultaneously trying to get a latch, only one process at a time will ever hold it.

Sometimes it is better to partition a set of logically-related data, such as a table from a database, rather than store all of the data in block of shared memory that corresponds to a single latch. A set of data may be partitioned by storing subsets of the data into multiple blocks of shared memory, where each block has its own corresponding latch. By partitioning a set of data in this manner, multiple processes are allowed to simultaneously access the data, as long as they only access the part of the data that corresponds to the latch or latches that they hold. This increases the concurrency within and the scalability of the system.

According to one approach, smaller granularity latches may be used in conjunction with larger granularity latches. Each larger granularity latch covers a group of shared resources, while each smaller granularity latch covers a subgroup of shared resources. For example, a set of data may be stored in a group of resources (e.g. shared memory regions) that is composed of subgroups of resources (shared memory blocks), where the group of resources corresponds to one latch (a "parent latch") and the subgroups of resources are protected by their own latches ("child latches"). When a process requires exclusive access to data in one or more of the shared memory blocks, the process acquires the appropriate child latches. This allows other processes to simultaneously access data stored in the shared memory blocks that correspond to the other child latches.

While child latches improve scalability, they also create the potential for deadlock. For example, a process P1 may wish to access the subgroups of shared resources that correspond to child latches L1 and L2. If L1 is FREE and L2 is BUSY, process P1 may acquire latch L1 and wait for L2 to become FREE. However, deadlock will occur if the process P2 that holds L2 requires L1, and suspends processing without releasing L2 while it waits for L1. Because both P1 and P2 are waiting for each other, both suspend and will never make progress.

One approach to avoiding deadlock in these circumstances is to require processes that already hold at least one child latch to attempt to acquire additional child latches in a non-blocking manner. For example, the process should only make one attempt at acquiring each additional child latch, and must be able to handle the situation if the attempt fails. The process cannot repeatedly try to get the additional child latch.

In the approach described above, the process of acquiring a second child latch is complicated, and acquiring all of the child latches for a given parent latch may be virtually impossible. However, to perform operations that require exclusive access to the group of resources covered by the parent latch, a process must acquire all of the child latches. For example, all child latches must also be acquired for a process to get a consistent snapshot of all of the resources. In addition, all of the child latches would have to be acquired before a process could alter the child-latch-to-resource mapping. Such an operation may involve, for example, assigning fifteen child latches to a group of resources previously covered by ten child latches.

In light of the foregoing, it is highly impractical to use child latches when operations that require a process to acquire exclusive access to a group of resources are allowed. Consequently, one latch must be used for the entire group of resources, creating a bottleneck and diminishing the scalability of the system. Thus, it is desirable to provide techniques that allow child latches to be used in a way that avoids deadlock. It is further desirable to provide techniques that allow child latches to be used without significantly impacting the efficiency of operations that require exclusive access to all of the resources that correspond to a set of child latches.

SUMMARY OF THE INVENTION

A method and apparatus for ordering and accessing latches according to an established hierarchy is provided. A group of resources is divided into a plurality of subgroups of resources. Each subgroup of resources is provided its own latch. The latches for the subgroups of resources are ordered. When a process requires access to more than one subgroup of resources, the process acquires the latches for the subgroups in an order that is based on the order of the latches. By using these access techniques, processes may simultaneously access different subgroups of the group of resources without the possibility of deadlock.

According to one aspect of invention, a process that requires all subgroups within a group of resources acquires a parent latch associated with the group of resources. The process then acquires the latches for each subgroup in a sequence that is based upon the order of the latches. As the process acquires each new latch, the process updates a current position value in the parent latch to indicate the most-recently-acquired latch. The current position value may be used by a cleanup entity in case the process dies prematurely. After acquiring all of the latches, the process releases the latches in reverse order, and updates the current position value as each latch is released. Thus, the current position value may be used for cleanup whether the process dies while attempting to acquire all latches or while releasing all latches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing a hierarchical latching system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
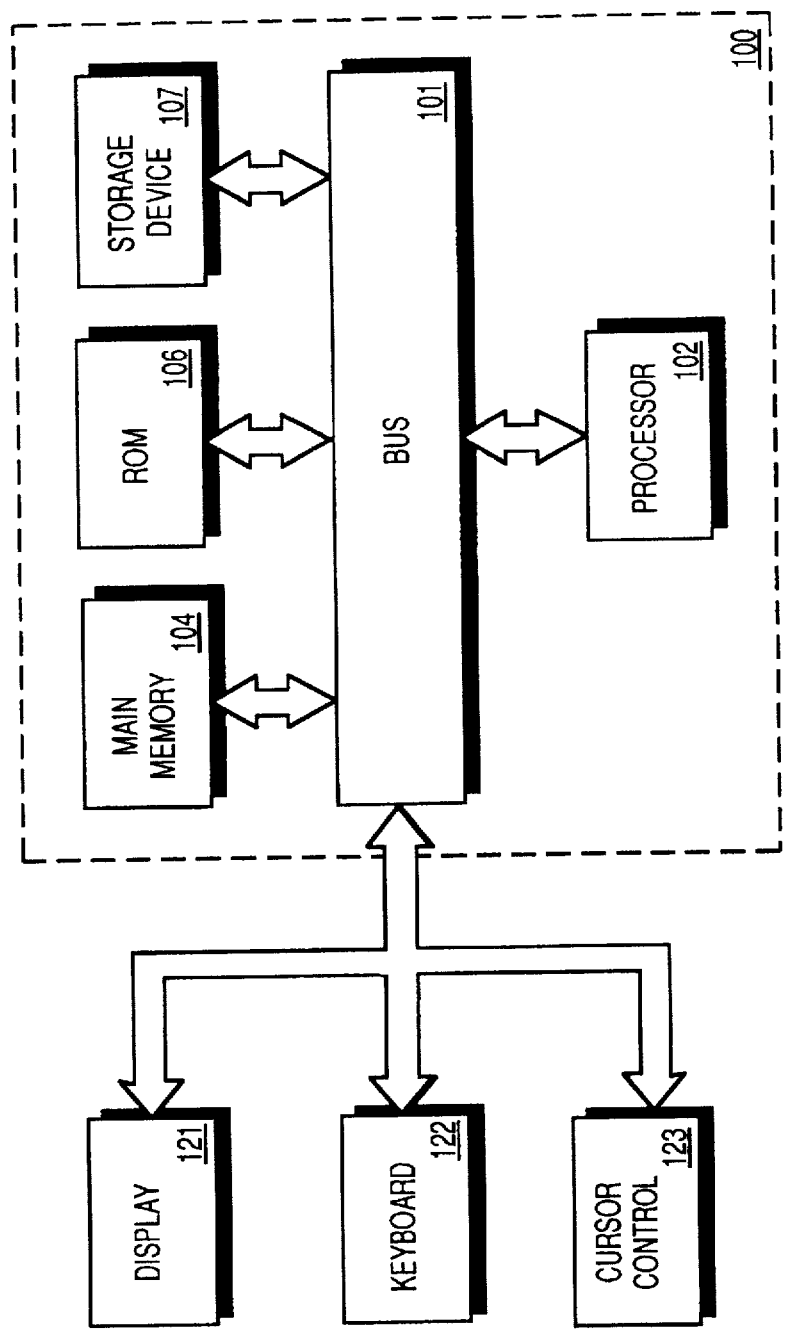
FIG. 1 is a block diagram of computer system upon which an embodiment of the present invention can be implemented.

Referring to FIG. 1, it is a block diagram of computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to provide a latching mechanism that avoids deadlock. According to one embodiment, computer system 100 provides hierarchical latching in response to processor 102 executing sequences of instructions contained in memory 104. Execution of the sequences of instructions contained in memory 104 causes processor 102 to establish an order to a set of latches, as will be described hereafter. In alternative embodiments, hard-wired circuitry may be used in place of or in combination with software instructions to implement the present invention. Thus, the present invention is not limited to any specific combination of hardware circuitry and software.

HIERARCHICAL LATCHES

Hierarchical latches are similar to the child latches described above, with the difference that hierarchical latches for each resource group are ordered with respect to each other. Various techniques may be used to establish an order for a set of hierarchical latches. For example, a number may be assigned to each child latch, where each child latch for a resource group has a unique number with respect to the other child latches for the resource group. In a system that creates hierarchical latches by assigning numbers to child latches, a child latch associated with a first number may be considered higher in the hierarchy of child latches than a child latch associated with a second number if the first number has a predetermined arithmetic relationship relative to the second number. For example, a child latch associated with a lower number may be considered higher in the hierarchy than a child latch associated with a higher number.

Figure 2:
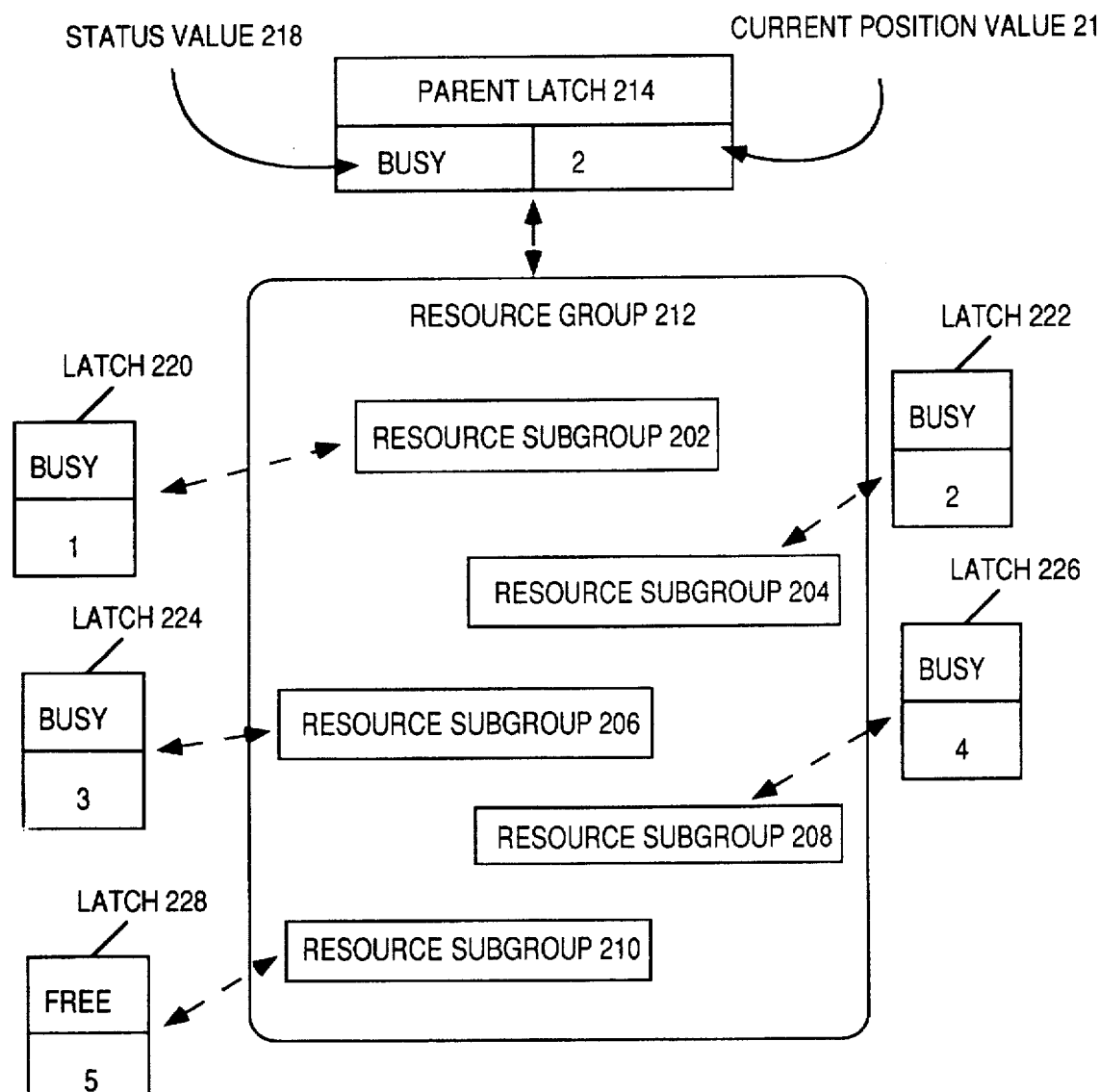
FIG. 2 is a block diagram illustrating a system that includes a resource group comprised of a plurality of resource subgroups, where a set of hierarchical latches are used to control access to the plurality of resource subgroups according to an embodiment of the invention.

FIG. 2 is a block diagram illustrating a system that includes a resource group 212 comprised of a plurality of resource subgroups 202, 204, 206, 208 and 210. A parent latch 214 is associated with the resource group 212. The parent latch has a status value 218 and a current position value 216. The status value 218 indicates whether the latch is currently owned by any process. The use of the current position value 216 shall be described in later detail below.

Child latches 220, 222, 224, 226 and 228 are associated with resource subgroups 202, 204, 206, 208 and 210, respectively. In the illustrated embodiment, each child latch has a status value and a number. The status value of a latch indicates whether the latch is BUSY or FREE. The number associated with a child latch is used to establish a hierarchy among the child latches. For example, a child latch with a lower number is considered higher in the hierarchy than a child latch associated with a higher number in one embodiment of the invention. In such an embodiment, the child latches of parent latch 214 have the order: child latch 220, child latch 222, child latch 224, child latch 226, and finally child latch 228.

Figure 3:
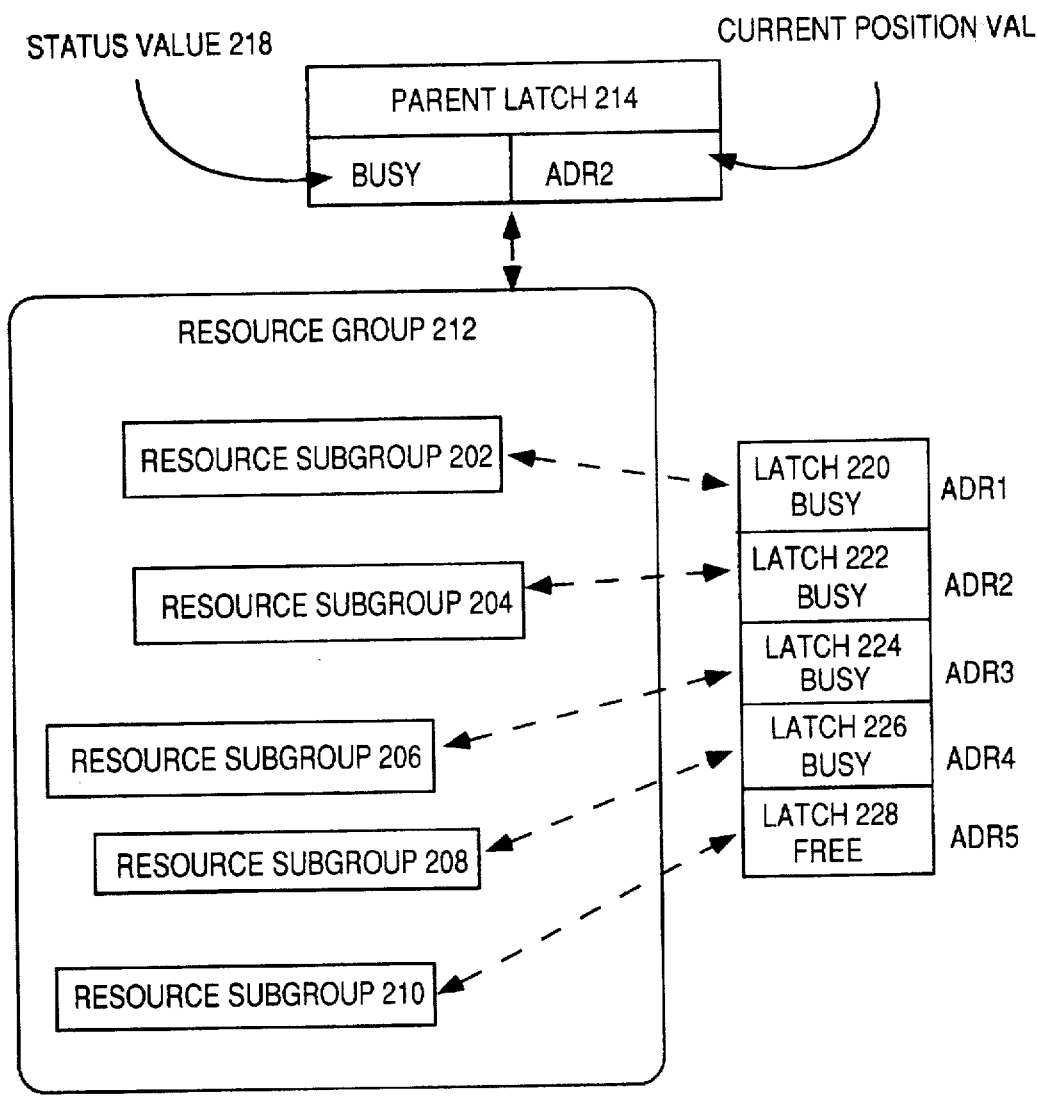
FIG. 3 illustrates an embodiment in which the order of the child latches is based on the storage location of the status values associated with the latches.

Referring to FIG. 3, it illustrates an alternate embodiment in which the order of the child latches 220, 222, 224, 226 and 228 is based on the storage location of the status values associated with the latches. Specifically, addresses ADR1, ADR2, ADR3, ADR4 and ADR5 are used to store the status values for child latches 220, 222, 224, 226 and 228, respectively. Addresses ADR1, ADR2, ADR3, ADR4 and ADR5 correspond to unique numeric values. Consequently, the order of addresses ADR1, ADR2, ADR3, ADR4 and ADR5 may be adopted as the order of the child latches that correspond to the stored status values.

The embodiments shown in FIGS. 2 and 3 illustrate two of numerous possible ways in which an order may be established for a set of child latches. The actual mechanism used to establish an order to the child latches may vary from implementation to implementation. Consequently, the present invention is not limited to any particular mechanism for establishing an order to child latches. For the purpose of explanation, the embodiment illustrated in FIG. 2 shall be used to describe the various aspects of the present invention.

USING LATCH HIERARCHY TO AVOID DEADLOCK

Once a hierarchy has been established for a set of child latches, latch acquisition is performed based on the hierarchy in a manner that avoids deadlock. Specifically, when a process is to perform an operation that requires exclusive access to more than one resource subgroup within a resource group, the process always acquires the child latches it requires in the sequence specified by the hierarchy of the child latches.

For example, assume that a process P1 in the system shown in FIG. 2 needs to perform an operation that requires exclusive access to resource subgroups 202 and 206. Resource subgroup 202 is associated with latch 220, and resource subgroup 206 is associated with latch 224. Because a lower number has been assigned to latch 220, latch 220 is higher in the latch hierarchy than latch 224. Therefore, according to the acquisition rule described above, process P1 must request latch 220 before requesting any other child latch for any resource subgroup of resource group 212. Process P1 cannot attempt to acquire latch 224 until it acquires latch 220. After acquiring latch 220, process P1 may attempt to acquire latch 224 to perform the operation. When process P1 is acquires latch 224, process P1 performs the operation.

Deadlock is not possible in a hierarchical latch scheme that adopts the above rule. Specifically, when process P1 holds child latch 220 and tries to get child latch 224, there can be no process P2 which holds child latch 224 and is trying to get child latch 220. Such a process P2 would be in violation of the acquisition rule described above, since it would have acquired a lower ordered latch (child latch 224) before acquiring a higher latch (child latch 220) that it required.

If a second process P2 also required latches 220 and 222, the second process P2 must first acquire child latch 220 before trying to acquire child latch 222. Even if process P2 holds child latch 222 and is trying to acquire child latch 224 at the same time that process P1 holds child latch 220 and is trying to acquire child latch 224, this is not a deadlock situation. Processes P1 and P2 are not blocking each other; one of them will first get latch 224, free it, and then allow the other to get it.

OPERATIONS THAT REQUIRE ALL RESOURCE SUBGROUPS

As long as all processes that access any subgroup of resource group 212 abide by the acquisition rule described above, no two processes can block each other. Because hierarchical latches avoid the possibility of deadlock, a process can safely try to get all child latches 220, 222, 224, 226 and 228, as long as it gets them in the order dictated by the established hierarchy (e.g. in ascending numerical order).

For example, consider the situation illustrated in FIG. 2. In FIG. 2, a process 230 wants to acquire all of the child latches 220, 222, 224, 226 and 228. The process 230 has already acquired child latches 220 and 222, and is now attempting to acquire child latch 224. Another process 232 holds latches 224 and 226.

Based on the acquisition rule described above, process 232 will not try to get any of the child latches that process 230 currently holds, because that would violate the acquisition rule described above. If process 232 is trying to acquire an additional child latch, the child latch would have to be a child latch that is lower in the hierarchy than child latch 226. P1 cannot be holding any child latch lower in the hierarchy than latch 226, because the highest ordered child latch required but not currently held by process 230 is latch 224. Consequently, process 232 is guaranteed to eventually succeed. Therefore, process 232 will eventually release latches 224 and 226, and process 230 will eventually make progress.

THE PARENT LATCH

The acquisition technique described above may be used to avoid deadlock with any set of ordered latches, regardless of whether any parent latch or child latch relationship exists. However, according to one embodiment of the invention, a parent latch is provided for each set of ordered latches and used by processes that want to acquire the latches in an ordered set latches.

According to one embodiment, the parent latch contains a list to which all of its child latches are linked, where the lowest numbered child latch is at the beginning of the list while the highest numbered child latch is at the end of the list. When an process wants to acquire all child latches of a given parent latch, the process first attempts to acquire the parent latch. The process first acquires the parent latch so that the process can subsequently modify the parent latch as it tries to get all of the child latches.

As a process acquires each child latch, the progress of the process is recorded in the parent latch. Specifically, the current position value 216 is updated to indicate the last child latch that has been acquired. In the illustrated example of FIG. 2, process 230 is attempting to acquire the latches of all resource subgroups within resource group 212. Therefore, process 230 first acquired the parent latch 214. After acquiring the parent latch 214, and before acquiring any child latches, the current position value 216 of the parent latch 214 is updated to indicate that the process 230 had not yet acquired any child latches.

When the process 230 acquired child latch 220, the current position value 216 of the parent latch 214 is updated to indicate that process 230 had acquired latch 220 (latch number "1"). After acquiring latch 220, process 230 acquires latch 222. The current position value 216 is then updated to indicate that process 230 had progressed to latch 222 (latch number "2"). FIG. 2 illustrates a state in which process 230 has progressed to latch 222. Consequently, a "2" is stored as the current position value 216.

According to one embodiment, the current position value is used for process recovery. Specifically, assume that a process dies while in the process of trying to acquire all child latches. Since the progress of the dead process is recorded in the parent latch, a cleanup entity knows that all child latches that are located prior to and including the last child latch recorded in the current position value in the parent latch need to be freed.

According to one embodiment, a process that has acquired all child latches frees the child latches in reverse hierarchical order. Thus, latch 228 would be released before latch 226, and latch 226 would be released before latch 224, etc. As a process frees each child latch, the progress is also recorded in the current position value 216 of the parent latch 214. Thus, if a process dies while freeing child latches, the current position value 216 may be used by the cleanup entity in the same manner as described above.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing access to a group of resources, the method comprising the steps of:

dividing the group of resources into a plurality of subgroups of resources;

establishing a correlation between said plurality of subgroups of resources and a plurality of latches;

associating a parent latch with said plurality of latches; if a particular process requires access to all of said plurality of subgroups of resources, then causing said particular process to acquire the parent latch; and if said particular process does not require access to all of said plurality of subgroups of resources, then causing said particular process to acquire one or more of said plurality of latches without acquiring said parent latch.

2. The method of claim 1 wherein:

the parent latch includes a current position indication;

the method further includes the steps of:

establishing an order to said plurality of latches;

causing said particular process to acquire the latches associated with said subgroups of resources in a sequence that is based upon the order of said plurality of latches; and if said particular process has acquired said parent latch, then when said particular process obtains one of said plurality of latches causing said particular process to update the current position indication to indicate that said particular process has acquired said one of said plurality of latches.

3. The method of claim 2 wherein:

said particular process dies; and the method further including the step of if said particular process has acquired the parent latch when said particular process dies, then causing a cleanup entity to determine which of said plurality of latches need to be freed based on said current position indication.

4. The method of claim 2 further comprising the step of if said particular process has acquired said parent latch, then causing said particular process to release said plurality of latches in the sequence based on said order of said plurality of latches.

5. The method of claim 4 wherein the step of causing said particular process to release said plurality of latches comprises the step of causing the particular process to release said plurality of latches in an order that is reverse to the order in which the process acquired the latches.

6. The method of claim 2 wherein the step of establishing an order to said plurality of latches includes the step of assigning a number to each of said plurality of latches.

7. The method of claim 1 wherein the step of dividing a group of resources into a plurality of subgroups of resources includes dividing a group of shared memory blocks into a plurality of subgroups of shared memory blocks.

8. The method of claim 1 wherein the step of establishing a correlation between said plurality of subgroups of resources and a plurality of latches includes the step of associating each subgroup of said plurality of subgroups of resources with one of said plurality of latches.

9. A method for providing access to a plurality of subgroups of resources, the method comprising the steps of:

causing a particular process that requires access to all subgroups of said plurality of subgroups to acquire a plurality of latches in a sequence that is based on a hierarchy established for said plurality of latches, wherein said plurality of latches correspond to said plurality of subgroups of resources; and causing said particular process to update a current position value to indicate a most-recently-acquired latch of said plurality of latches.

10. The method of claim 9 wherein:

a parent latch is associated with a group of resources that includes all of said plurality of subgroups of resources;

the current position value is covered by said parent latch; and the method further comprises the step of causing the particular process to acquire the parent latch before updating said current position value.

11. The method of claim 9 further comprising the step of, if said particular process terminates prematurely, causing a cleanup entity to release latches based on said current position value.

12. The method of claim 9 further comprising the steps of:

causing the particular process to release said plurality of latches in an order based upon said hierarchy; and causing the particular process to update the current position value when the particular process releases a latch on a subgroup of resources to indicate that the particular process has released the latch on the subgroup of resources.

13. The method of claim 9 further comprising the step of establishing said hierarchy for said plurality of latches by assigning each of said plurality of latches a unique number.

14. The method of claim 9 further comprising the step of establishing said hierarchy for said plurality of latches based upon address locations at which values for said plurality of latches are stored.

15. A computer readable medium having stored thereon sequences of instructions for providing access to a plurality of subgroups of resources, the sequences of instructions including sequences of instructions which, when executed by one or more processors, cause the one or more processors to perform the steps of:

causing a particular process that requires access to all subgroups of said plurality of subgroups to acquire a plurality of latches in a sequence that is based on a hierarchy established for said plurality of latches, wherein said plurality of latches correspond to said plurality of subgroups of resources; and causing said particular process to update a current position value to indicate a most-recently-acquired latch of said plurality of latches.

16. The computer readable medium of claim 15 wherein:

a parent latch is associated with a group of resources that includes all of said plurality of subgroups of resources;

the current position value is covered by said parent latch; and the sequences of instructions further include sequences of instructions for causing the particular process to acquire the parent latch before updating said current position value.

17. The computer readable medium of claim 15 further comprising sequences of instructions for causing a cleanup entity to release latches based on said current position value if said particular process terminates prematurely.

18. The computer readable medium of claim 15 further comprising sequences of instructions for:

causing the particular process to release said plurality of latches in an order based upon said hierarchy; and causing the particular process to update the current position value when the particular process releases a latch on a subgroup of resources to indicate that the particular process has released the latch on the subgroup of resources.

* * * * *